(No Model.)

H. MATTULLATH.
FAUCET.

No. 296,031. Patented Apr. 1, 1884.

Witnesses
Geo. H. Strong.
J. H. Krause.

Inventor,
H. Mattullath
G. Dewey & Co.
Attorney

UNITED STATES PATENT OFFICE.

HUGO MATTULLATH, OF SAN FRANCISCO, CALIFORNIA, ASSIGNOR TO THE SECURITY PACKAGE COMPANY, OF SAME PLACE.

FAUCET.

SPECIFICATION forming part of Letters Patent No. 296,031, dated April 1, 1884.

Application filed September 17, 1883. (No model.)

*To all whom it may concern:*

Be it known that I, HUGO MATTULLATH, of the city and county of San Francisco, State of California, have invented an Improved Faucet; and I hereby declare the following to be a full, clear, and exact description thereof.

My invention relates to certain improvements in faucets; and it is especially applicable to a faucet for which Letters Patent No. 238,300 were issued to me on the 1st day of March, A. D. 1881.

My present invention consists in a screw-faucet having a valve moving within it to close or open the outlet, a wheel and chambered sleeve fitting the exterior of the body, and a screw-cap, having smaller threads than those in the valve-stem, fits over the end of the faucet-body and prevents the valve from being screwed entirely out.

Figure 1:
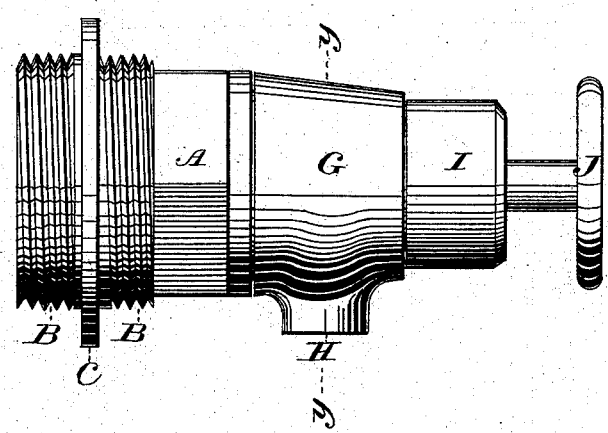
Figure 2:
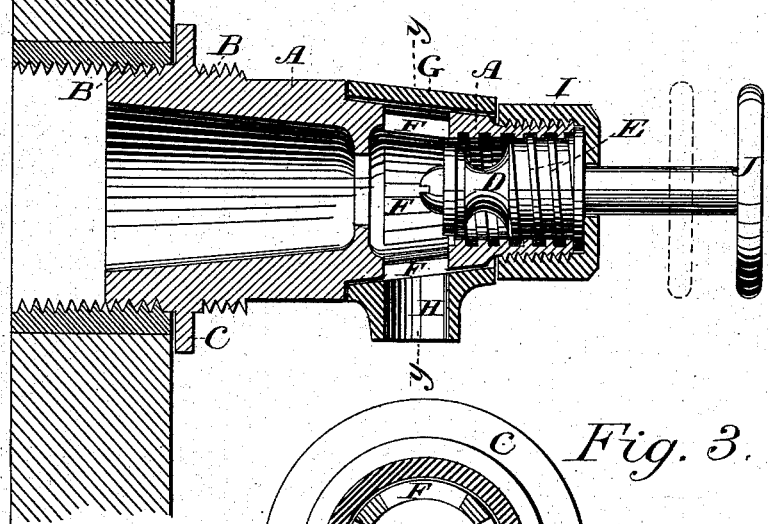
Figure 3:
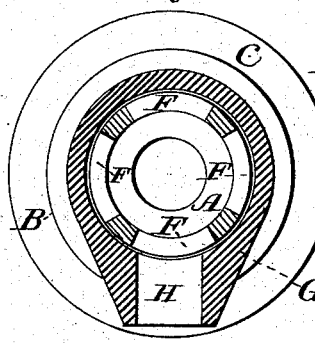

Referring to the accompanying drawings for a more complete explanation of my invention, Figure 1 is a side elevation of my faucet. Fig. 2 is a longitudinal section, the valve D open. Fig. 3 is a vertical section on the line *y y*, Fig. 2.

A is the body of my faucet, having two sets of screw-threads, B B, one upon each side of a flange, C, so that the faucet may be reversed, as in my former patent. The body of the faucet extends beyond the screw-threads in one direction to receive the valve D, which has screw-threads turning in corresponding ones within the opening in the body A, so that the valve may be forced against its seat to close the passage, or be withdrawn from the seat.

Around the body A, at a short distance outward from the seat, are openings F, made through the sides, so that when the valve has been withdrawn from the seat the contents of the vessel may flow out through these openings. The outside of this portion of the faucet-body is turned to receive a sleeve, G, which fits it closely enough to prevent leakage beyond its ends; but it may be turned around upon the faucet. An opening, H, is made upon one side of the sleeve, and a channel around the interior of the sleeve provides a free access to this opening from all the openings F in the faucet-body. The end of the body A has exterior screw-threads of a less pitch than those of the valve, and a cap, I, fits upon this end. The valve-stem extends outward through this cap, and a washer prevents possible leakage behind the valve. The hand-wheel J, by which the valve is turned, is made smaller in diameter than the screw-threads B, as shown in my former patent, so that the faucet may be reversed and the outer end turned inward for transportation.

It will be seen that when the faucet has been screwed in to its seat for use a fixed discharge-nozzle would not always stand in the right position for discharge, and if it were a fixed nozzle the effort to turn it around to the proper point would result in the damage or destruction of the faucet. By my invention the faucet is first screwed in until properly seated. The sleeve is then turned until the discharge-nozzle stands in the proper position.

Having thus described my invention, what I claim as new, and desire to secure by Letters Patent, is—

In a screw-faucet, the valve D, moving within it to close or open the outlet, and having screw-threads E, stem and operating-wheel J, and chambered sleeve G, fitting the exterior of the body A, in combination with the screw-cap I, through which the valve-stem passes, all substantially as shown and described.

HUGO MATTULLATH.

Witnesses:
C. D. COLE,
J. H. BLOOD.